(12) United States Patent
Jennings et al.

(10) Patent No.: US 11,403,958 B2
(45) Date of Patent: Aug. 2, 2022

(54) LESSON DETERMINATION FOR DYNAMIC GAMIFICATION APPLICATION

(71) Applicant: T-Mobile USA, Inc., Bellevue, WA (US)

(72) Inventors: Claire Jennings, Kirkland, WA (US); Seth Pham, Everett, WA (US); Mark Freckleton, Silverdale, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 337 days.

(21) Appl. No.: 16/203,482

(22) Filed: Nov. 28, 2018

(65) Prior Publication Data

US 2019/0180635 A1     Jun. 13, 2019

Related U.S. Application Data

(60) Provisional application No. 62/598,331, filed on Dec. 13, 2017.

(51) Int. Cl.
  *G09B 5/00* (2006.01)
  *G06N 20/00* (2019.01)
  *G09B 5/06* (2006.01)
  *G09B 7/04* (2006.01)

(52) U.S. Cl.
  CPC .............. *G09B 5/00* (2013.01); *G06N 20/00* (2019.01); *G09B 5/06* (2013.01); *G09B 7/04* (2013.01)

(58) Field of Classification Search
  None
  See application file for complete search history.

(56) References Cited

U.S. PATENT DOCUMENTS

| | | | |
|---|---|---|---|
| 10,079,850 B1* | 9/2018 | Patil | H04L 63/1433 |
| 2007/0231780 A1* | 10/2007 | Shulman | G09B 7/08 434/350 |
| 2008/0026359 A1* | 1/2008 | O'Malley | G09B 7/06 434/323 |
| 2009/0226870 A1* | 9/2009 | Minotti | G09B 7/00 434/322 |
| 2011/0107363 A1* | 5/2011 | Sanghavi | G06Q 30/0224 725/23 |
| 2011/0295667 A1* | 12/2011 | Butler | G06Q 30/0239 705/14.12 |

(Continued)

FOREIGN PATENT DOCUMENTS

WO     2017205924 A1     12/2017

OTHER PUBLICATIONS

International Application No. PCT/US2018/064365, International Search Report and Written Opinion, dated Mar. 25, 2019, 10 pages.

*Primary Examiner* — Steve Rowland
(74) *Attorney, Agent, or Firm* — Han Santos, PLLC (57) ABSTRACT

A method of dynamic lesson determination is performed by an application server. The application server receives telemetry data and a corresponding user identification (ID). The telemetry data indicates at least one usage of a user device by a user associated with the user ID. The application server stores the telemetry data to one or more databases and analyzes the telemetry data to determine one or more lessons, which are then sent, by the application server, to a dynamic gamification application of the user device.

20 Claims, 5 Drawing Sheets

(56) References Cited

U.S. PATENT DOCUMENTS

| | | | |
|---|---|---|---|
| 2012/0173373 A1* | 7/2012 | Soroca | G06F 16/9535 705/26.3 |
| 2012/0214568 A1* | 8/2012 | Herrmann | G07F 17/323 463/16 |
| 2012/0258437 A1* | 10/2012 | Sadeh-Koniecpol | G06F 21/56 434/362 |
| 2012/0270618 A1* | 10/2012 | Abramoff | G07F 17/3288 463/9 |
| 2013/0054401 A1* | 2/2013 | Kelley | G06Q 30/06 705/26.1 |
| 2013/0167707 A1* | 7/2013 | Shimizu | G09B 15/00 463/9 |
| 2013/0173381 A1* | 7/2013 | Yerli | H04N 21/8173 705/14.43 |
| 2013/0238445 A1* | 9/2013 | Rao | G06Q 30/0203 705/14.66 |
| 2013/0295876 A1* | 11/2013 | Sargin | G06Q 30/0212 455/405 |
| 2013/0347020 A1* | 12/2013 | Smock | A63F 13/92 725/23 |
| 2014/0012595 A1 | 1/2014 | Fox et al. | |
| 2014/0017653 A1* | 1/2014 | Romney | G09B 7/00 434/350 |
| 2014/0072235 A1* | 3/2014 | Costantino | H04N 21/4524 382/218 |
| 2014/0087355 A1* | 3/2014 | Henry | G09B 7/00 434/362 |
| 2014/0199663 A1* | 7/2014 | Sadeh-Koniecpol | H04L 63/1408 434/118 |
| 2015/0094139 A1* | 4/2015 | Kargar | A63F 13/61 463/29 |
| 2015/0375040 A1 | 12/2015 | Sigal et al. | |
| 2016/0034923 A1 | 2/2016 | Majumdar et al. | |
| 2016/0063204 A1 | 3/2016 | Srinivasan | |
| 2016/0140642 A1* | 5/2016 | Jiao | G06Q 40/08 705/2 |
| 2016/0335424 A1* | 11/2016 | Hampson | G06Q 10/0639 |
| 2017/0084119 A1* | 3/2017 | Smock | G07F 17/3211 |
| 2017/0103674 A1* | 4/2017 | Sadeh-Koniecpol | H04L 63/1433 |
| 2017/0178531 A1* | 6/2017 | Swank | G09B 7/08 |
| 2017/0213472 A1* | 7/2017 | Huffman | G06F 21/62 |
| 2017/0304707 A1* | 10/2017 | Morton | G09B 9/003 |
| 2018/0090024 A1* | 3/2018 | Somers | A63F 13/00 |
| 2018/0247562 A1* | 8/2018 | Downs | G09B 5/00 |
| 2019/0258953 A1* | 8/2019 | Lang | G06N 5/025 |
| 2019/0260794 A1* | 8/2019 | Woodford | G06N 20/20 |
| 2019/0303583 A1* | 10/2019 | Hosking | G09B 5/06 |
| 2019/0334905 A1* | 10/2019 | Lelcuk | H04L 9/3213 |

* cited by examiner

LESSON DETERMINATION FOR DYNAMIC GAMIFICATION APPLICATION

CROSS-REFERENCE TO RELATED APPLICATION

This application claims the benefit of U.S. Provisional Application No. 62/598,331 entitled "CYBER SECURITY GAMES," filed Dec. 13, 2017 and expressly incorporated herein by reference in its entirety.

BACKGROUND

Educational games are games explicitly designed with educational purposes, or which have incidental or secondary educational value. Educational games are games that are designed to help people to learn about certain subjects, expand concepts, reinforce development, understand a historical event or culture, or assist them in learning a skill as they play. Game types include but are not limited to board, card, and video games. An educational game is a game designed to teach humans about a specific subject or to teach them a skill. Games are interactive play that teach goals, rules, adaptation, problem solving, and interaction, all represented as a story or theme. They satisfy our fundamental need to learn by providing enjoyment, passionate involvement, structure, motivation, gratification, adrenaline, creativity, social interaction and emotional stimulation in the game itself while the learning takes place.

Game-based learning (GBL) is a type of game play that has defined learning outcomes. Generally, game-based learning is designed to balance subject matter with gameplay and the ability of the player to retain and apply said subject matter to the real world. With the increase and availability of technological devices, there has been a shift in what types of games people play. Video or electronic gaming has become more widely used than traditional board or card games. The goal of GBL is to provide play spaces that engage the user in a narrative while learning cognitive and social skills. The ability to immerse oneself in the gaming process facilitates learning in the environment of the game.

In some situations, the practice of "gamification" may be incorporated into the design and/or development of a software application. In some aspects, gamification is the integration of one or more game-design elements or game principles into a software application, whether that application is a gaming application or a non-gaming application. Gamification may employ game design elements to improve user engagement, productivity, learning, and so on.

Gamification techniques are intended to leverage a user's desire for socializing, learning, mastery, competition, achievement, status, self-expression, and so on, as game or play. For example, one gamification strategy is the use rewards for users who accomplish desired tasks or competition. The types of rewards may include points, achievement badges or levels, the filling of a progress bar, or providing the user with virtual currency. Making the rewards for accomplishing tasks visible to other players or providing leader boards are ways of encouraging players to compete.

Another approach to gamification is to make existing tasks feel more like games. Some techniques used in this approach include adding meaningful choices, onboarding with a tutorial, increasing challenges, and adding narratives.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., user equipment, application server, etc.), computer-readable media, and processes for the dynamic lesson determination for user device applications.

As mentioned above, game-based learning (GBL) and/or gamification techniques, may facilitate the learning of various skills. For example, a gamification application may be installed or presented on a user device. The gamification application may include one or more lessons that are presented to the user with problems and/or tasks that reinforce or teach particular skills. However, typical lessons provided by a gamification application are static. That is, the lessons do not take into account the user's existing knowledge or skills. For example, a typical gamification application may incorporate generic lessons into gameplay that do not take into account a user's existing knowledge of a particular topic and thus, the user may become less engaged and/or less motivated to continue gameplay. Furthermore, the lessons provided by a typical gamification application does not include the most recent or relevant subject matter for a particular topic.

One example topic of interest relates to cybersecurity. In general cybersecurity deals with the protection of computer systems from theft and/or damage to their hardware, software or information, as well as from disruption or misdirection of the services they provide.

Lessons provided to a user on cybersecurity may focus on user practices to control the physical access to the hardware, as well as protecting against harm that may come via misused/unauthorized network access, data access/manipulation and/or code injection. Due to malpractice by a user, whether intentional or accidental, the user and/or user device may be rendered susceptible to being tricked into deviating from secure procedures through various methods. The field of cybersecurity is of growing importance due to users' increased reliance on computer systems and the Internet. Wireless networks such as Bluetooth and Wi-Fi, the growth of "smart" devices, including smartphones, televisions and tiny devices as part of the Internet of Things (IoT) all increase a user's need to be educated on improved cybersecurity practices.

Other lessons provided to a user via a gamification application may relate to other of topics of interest such as healthcare to improve patient and/or healthcare provider practices and human resources to improve workplace behavior and/or practices.

However, as mentioned above, typical lessons provided to a user do not take into account a user's existing practices and/or knowledge. For example, a lesson regarding the development/creation of strong passwords may be given irrespective of a user's existing password practices. Even still, typical lessons regarding network security may be outdated and are still given irrespective of current or prevalent network security threats.

Accordingly, aspects of the present disclosure include an application server that is configured to dynamically determine one or more lessons to push to a dynamic gamification application present on a user device. In some examples, the application server may select the lessons to provide to the user in response to telemetry data that is gathered from the user device itself. The telemetry data may include data collected from the user device that indicates user behavior as it relates to the topic of the dynamic gamification application (e.g., cybersecurity). For example, the telemetry data may indicate user behavior such as passwords used by the user, websites visited, hyperlinks activated, etc. Thus, the application server may select the most relevant and/or important lessons to provide to the user based on their behavior. As a particular example, telemetry data that indicates that weak passwords are utilized by a user may prompt the application server to push a lesson to the dynamic gamification application regarding improved password selections. Conversely, telemetry data that indicates that strong passwords are being utilized by the user may prompt the application server to skip or delay lessons regarding password selection practices.

Furthermore, as will be described in further detail below, the application server may collect and consider other data in determining which lessons to push to the dynamic gamification application. In one example, the application server may collect telemetry data from other users regarding these other user's usage of their devices. By way of example, telemetry data collected from other users may indicate numerous users are visiting a website that is known (by the application server) to host malicious software. Thus, the application server may push a lesson to the dynamic gamification application of a particular user regarding safe web-surfing practices even though that user has not visited the malicious website in question.

Further data collected by the application server may include environmental data. As used herein, environmental data may include data collected from sources other than the user devices, themselves. In the context of cybersecurity, environmental data may relate to a current network security issue, a newly discovered vulnerability (e.g., with a network and/or user device itself), a newly discovered computer virus, etc. Thus, in addition to determining lessons based on telemetry data collected from the user device and telemetry data collected from other user devices, the application server may further consider this environmental data.

A user device, or user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
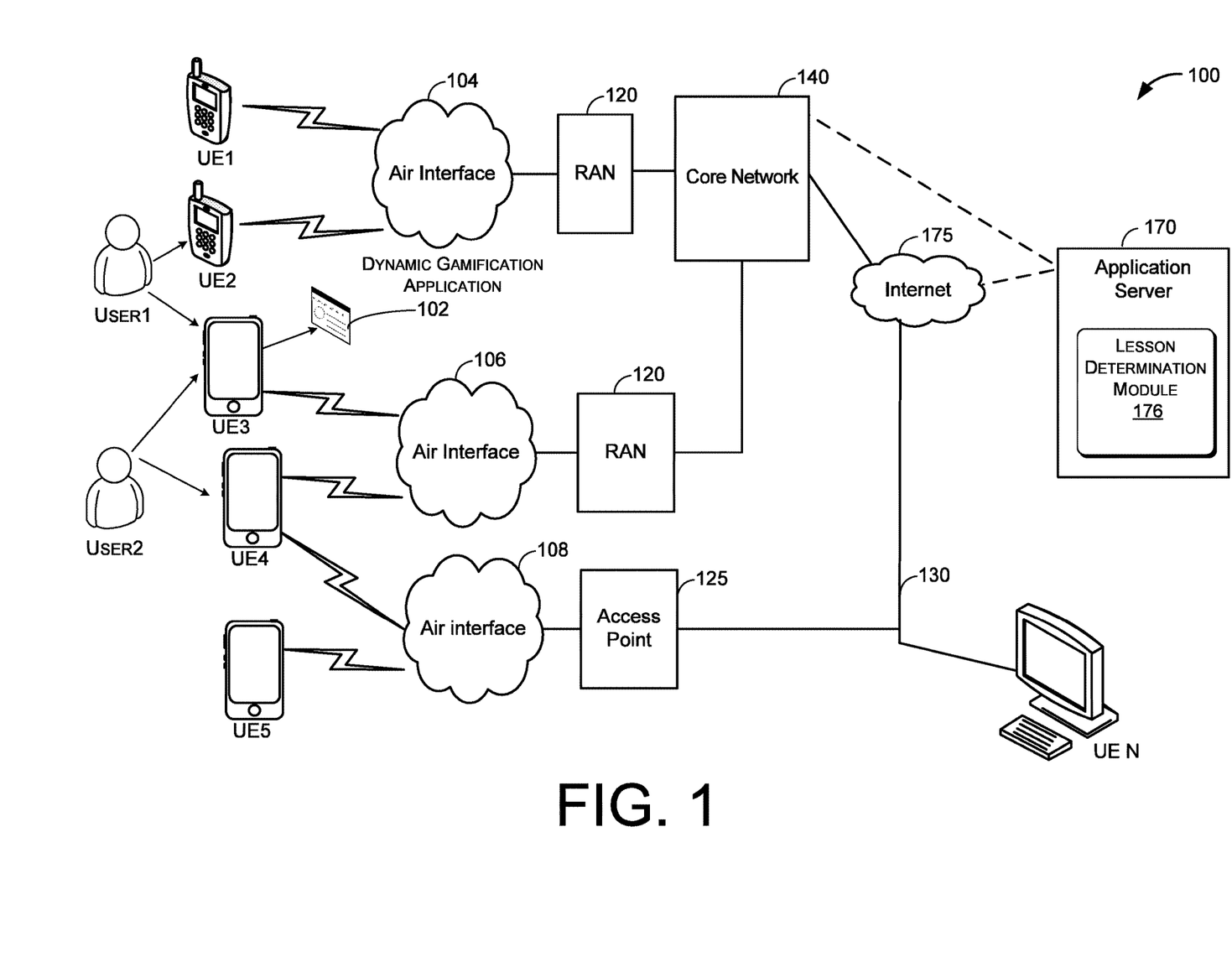
FIG. 1 illustrates an example architecture of a wireless communication network.

FIG. 1 illustrates a high-level system architecture of a wireless communication network 100 in accordance with various aspects. The wireless communication network 100 contains UEs 1 . . . N. The UEs 1 . . . N can include mobile phones, personal computers (e.g., a laptop computer, desktop computer, etc.), television receivers (e.g., a television, streaming device, digital video recorder, etc.), voice-activated virtual assistants, gaming consoles, and so on. For example, in FIG. 1, UEs 1 . . . 2 are illustrated as cellular mobile phones, UEs 3 . . . 5 are illustrated as cellular touchscreen mobile phones or smart phones, and UE N is illustrated as a desktop computer or laptop.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection 130. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . 5 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a direct wired connection 130 to the Internet 175, such as a direct connection to a modem or router, which can correspond to the access point 125 itself in an example (e.g., for a Wi-Fi router with both wired and wireless connectivity).

The core network 140 is configured to support one or more communication services (e.g., Voice-over-Internet Protocol (VoIP) sessions, Push-to-Talk (PTT) sessions, group communication sessions, social networking services, etc.) for UEs that can connect to the core network 140 via the RANs 120 and/or via the Internet 175, and/or to provide content (e.g., web page downloads) to the UEs.

Referring to FIG. 1, an application server 170 is shown as connected to the Internet 175, the core network 140, or both. The application server 170 can be implemented as a plurality of structurally separate servers, or alternately may correspond to a single server.

In some aspects, at least some of the wireless communication network 100 may implement one or more secure network configurations, such as firewalls, access control lists (ACLs), encrypted communications, system or code hardening, etc.

According to aspects of the present disclosure, one or more of the various UEs 1-N illustrated in FIG. 1 may include a locally-installed dynamic gamification application. In other aspects, the dynamic gamification application is network (e.g., web) based. Accordingly, the application server 170 includes a lesson determination module 176 that is configured to collect data (e.g., telemetry data, environmental data, etc.) and to provide relevant lessons to the dynamic gamification application 102. As will be described in more detail below, the application server 170 may analyze the collected data by a machine learning service module to determine one or more lessons to push to the dynamic gamification application 102.

As mentioned above, the wireless communication network 100 may provide for multi-user to multi-device capabilities. That is, the same user may utilize multiple different devices to access the wireless communication network 100 and multiple different users may utilize the same device to access the wireless communication network 100. For example, as shown in FIG. 1, user1 may utilize UE2 as well as UE3 to access wireless communication network 100. Similarly, user2 may utilize the same UE3 as well as a different UE (i.e., UE4) to access the wireless communication network 100.

Figure 2:
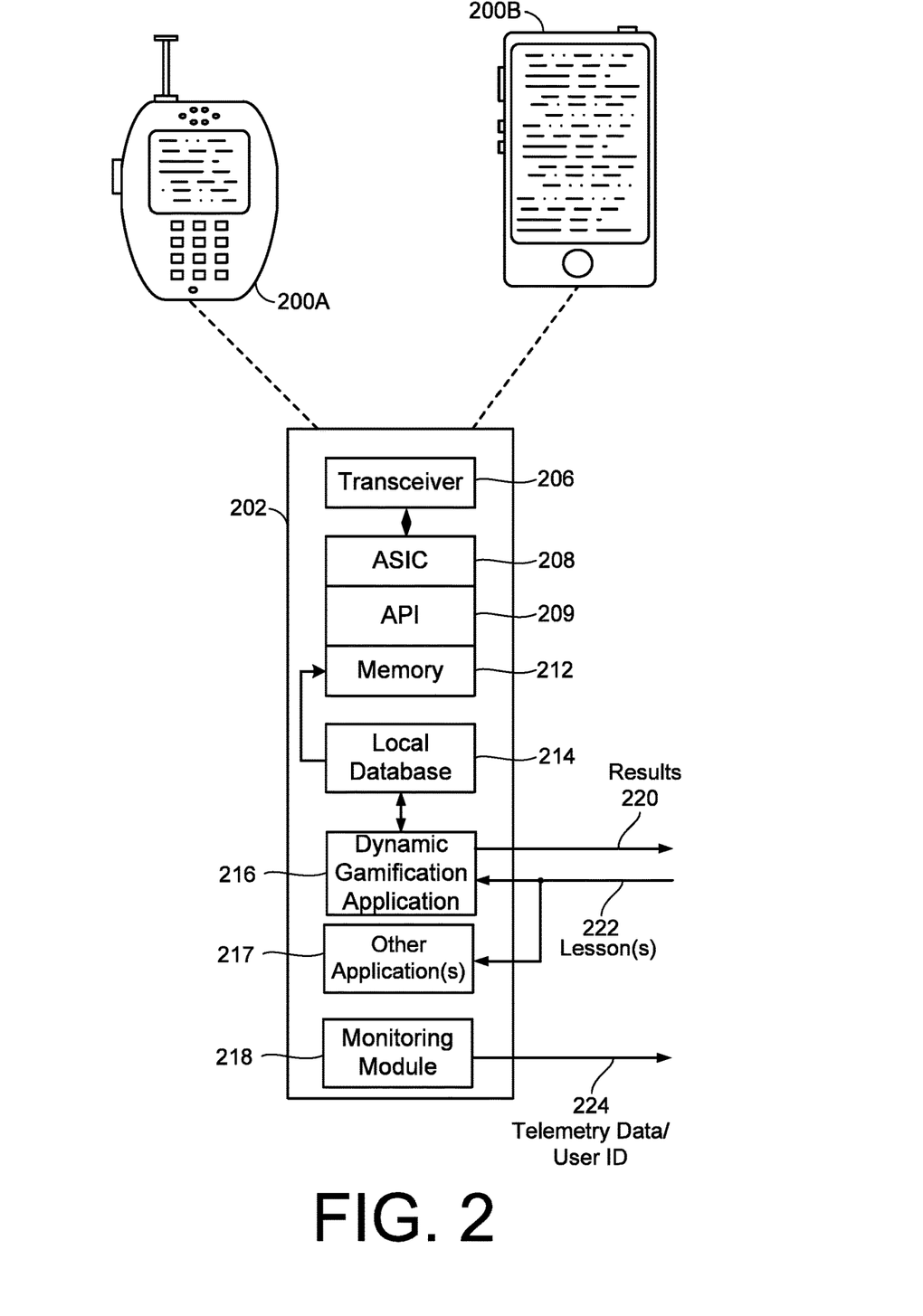
FIG. 2 illustrates examples of user equipments (UEs).

FIG. 2 illustrates examples of UEs (i.e., user devices) in accordance with embodiments of the present disclosure. UEs 200A and 200 B are possible implementations of any of the UEs 1-N of FIG. 1. The various device types illustrated in FIG. 2 include a mobile phone (e.g., UE 200A) and smart phone (e.g., UE 200B).

UEs 200A and 200B, may also be referred to as cellular phones and includes portable telephones that can make and receive calls over a radio frequency link while the user is moving within a telephone service area.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 209 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell but can be any secondary storage device as known in the art, such as magnetic media, EEPROM, optical media, tape, soft or hard disk, or the like.

Accordingly, an embodiment of the invention can include a UE (e.g., UE 200A-B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the platform 202 is illustrated as including a dynamic gamification application 216. Dynamic gamification application 216 may be a locally-installed or network-based application configured to present one or more problems/tasks to the user (e.g., USER1 of FIG. 1) based on one or more lessons 222 received from the application server 170. By way of example, the dynamic gamification application 216 may integrate the one or more lessons 222 into various gameplays, such as puzzles, real-time strategy, action, combat, first person shooter, sports, role-playing, trivia, etc. In some aspects, dynamic gamification application 216 may store the received lessons 222 to local database 214 for offline use.

In some aspects, the dynamic gamification application 216 may incorporate the ability to inject learning objectives, goals and telemetry into a game or application that is different from the game story or theme while minimally detracting from the game play. The dynamic gamification application 216 may also provide a reward related to the game or application for completing the learning objectives or goals. In some implementations, the dynamic gamification application 216 may incorporate as part of its function, the ability to track individual users learning objectives and goals across multiple user equipment platforms, games and applications.

In one example, the lessons 222 are directed to a topic of interest, such as cybersecurity. In other examples, the lessons are directed to other of topics of interest such as healthcare (e.g., dynamically determined lessons to improve patient and/or healthcare provider practices based on medical device and/or other user device telemetry data) and human resources (e.g., dynamically determined lessons to improve workplace behavior and/or practices based on user device telemetry data).

Dynamic gamification application 216 may also be configured to communicate with the application server 170 (via wireless communication network 100) to provide the application server 170 with results 220. In some aspects, the results 220 indicate metrics or scores of a previous gaming session performed by the user. For example, the metrics/scores may indicate how and/or which problems/questions were correctly solved by the user and how and/or which problems/questions were incorrectly solved by the user. The results 220 may further indicate other metrics such as how long the user took to complete a lesson, how long the user took to complete an individual problem, and/or how long the user played the dynamic gamification application 216.

In some implementations, dynamic gamification application 216 is an application specifically developed to interact (e.g., communicate) with the lesson determination module 176 of server 170. In other examples, dynamic gamification application 216 is an existing application not specifically developed to interact with the lesson determination module 176, but instead where the lesson determination module 176 is configured to inject one or more lessons into existing dynamic gamification applications. For example, dynamic gamification application 216 may be configured to utilize an application program interface (API) to allow in-app advertising, by way of a banner, video, audio, or interactive advergame. Thus, lesson determination module 176 may inject one or more lessons by way of the in-app advertising API to provide lessons to the user that do not necessarily relate to the topic and/or focus of the dynamic gamification application 216, itself.

As shown in FIG. 2, the platform 202 may also include an optional other application 217. Other application 217 may be any locally-installed or web-based application that is configured to present information and/or alerts to the user (e.g., USER1 of FIG. 1) based on one or more lessons 222 received from the application server 170. By way of example, the other application 217 may present one or more lessons 222 to the user in various forms, such as a notification, text, audio, video, etc. In the context of cybersecurity, the other application 217 may present one or more relevant articles, alerts, descriptions of improved cybersecurity practices to be implemented by the user.

Further included in the platform 202 is a monitoring module 218. In one aspect, monitoring module 218 is a client-side application and/or hardware module that interacts with an operating system of the platform 202 to intercept client-side application and device use. The device/application use may then be incorporated into telemetry data 224 that is then provided to the application server 170 for analysis. In some aspects, the telemetry data 224 may include information regarding which applications are being used, a location of the UE (e.g., GPS location coordinates and/or Wi-Fi location), internet use, chat, voice, and so on.

The telemetry data 224 may also indicate a measure of passwords (e.g., strong, average, weak, etc.) utilized by the user, websites visited by the user, hyperlinks activated by the user, text messages sent or received by the user, applications installed on the user device, a version number of an operating system of the user device, a version number of one or more applications installed on the user device, device settings of the user device, and/or security settings of one or more networks accessed by the user device.

In yet another example, telemetry data 224 may provide an indication of how a user interacts with an augmented reality (AR) and/or virtual reality (VR) application, whether the AR/VR application is the dynamic gamification application 216, itself, or another application independent of the dynamic gamification application 216. For example, if an AR application is used to identify and connect the platform 202 to a Wi-Fi connection, and the user does not pay attention to the safety level of the connection (e.g., the user connects to a public unsecured Wi-Fi network to transfer corporate data), then the corresponding telemetry data 224 could be utilized determine and/or develop one or more lessons 222 to push to the platform to address this potential security issue.

As shown in FIG. 2, the telemetry data 224 may also include an associated user identification (ID). In one aspect, the user ID identifies the telemetry data 224 as corresponding to the current user of the user device. In another example, the user ID is specific to the dynamic gamification application 216 or other application 217.

In some examples, such as a child protection enabled device, the monitoring module 218 is configured to collect and report the telemetry data 224 independent of the dynamic gamification application 216. For example, the monitoring module 218 may collect/intercept client-side application and/or device use regardless of whether the dynamic gamification application 216 is currently in use. Thus, the monitoring module 218 may be configured to collect/intercept client-side application and/or device use even if the dynamic gamification application 216 is not currently in use (e.g., not being executed). Furthermore, the client-side application use may include data related to the use of applications other than the dynamic gamification application 216, itself (e.g., web browser, messaging application, etc.).

Thus, in some aspects, the ASIC 208, memory 212, API 209, local database 214, dynamic gamification application 216, other application 217, and monitoring module 218 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. Voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
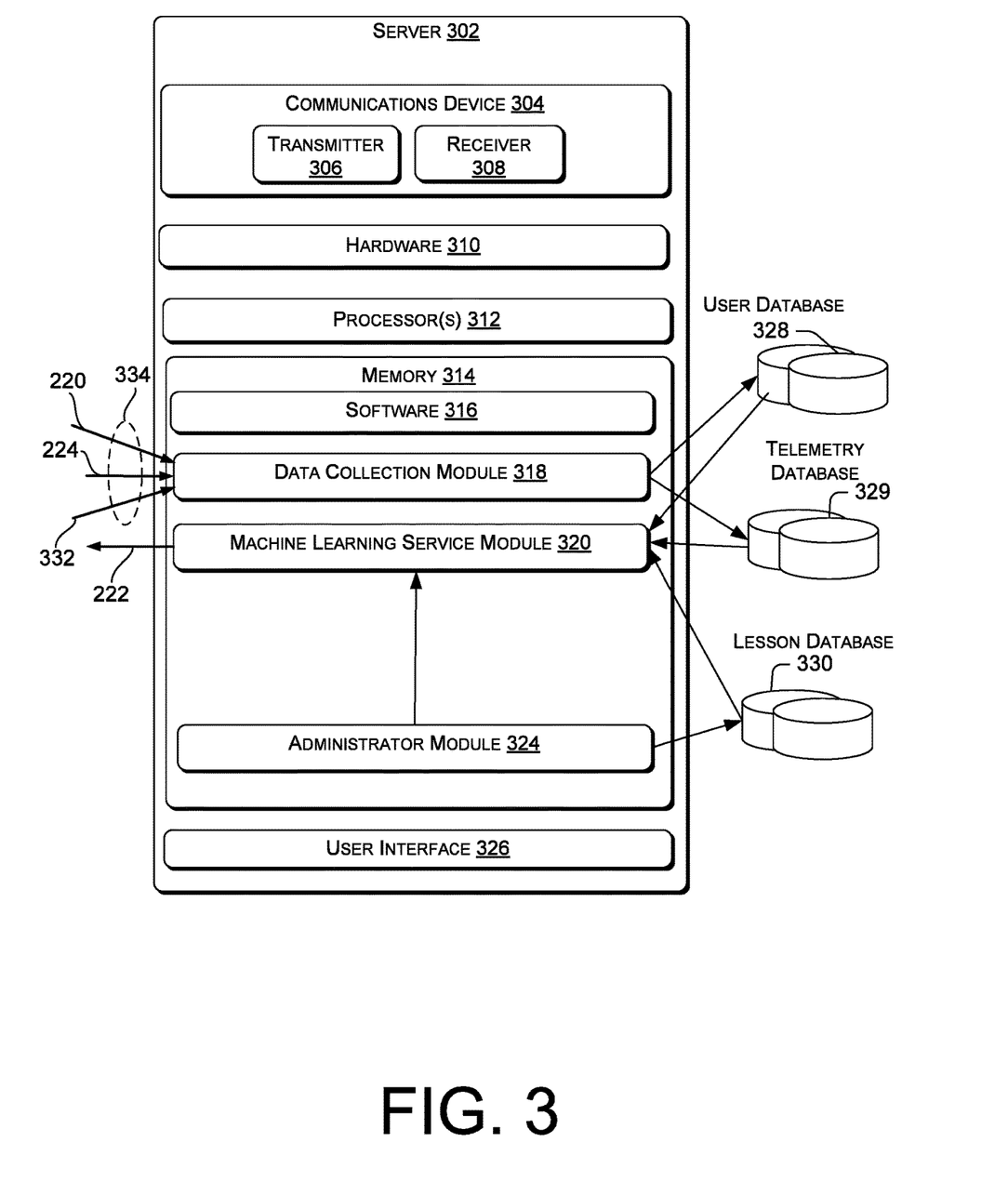
FIG. 3 illustrates an example application server.

FIG. 3 illustrates an example application server 302. Application server 302 is one possible implementation of application server 170 of FIG. 1. The components illustrated in FIG. 3 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The application server 302 may include at least one communication device (represented by the communication device 304) for communicating with other nodes. For example, the communication device 304 may comprise a network interface that is configured to communicate with one or more network entities via a wire-based or wireless links. In some aspects, the communication device 304 may be implemented as a transceiver configured to support wire-based or wireless signal communication. This communication may involve, for example, sending and receiving: messages, parameters, or other types of information. Accordingly, in the example of FIG. 3, the communication device 304 is shown as comprising a transmitter 306 and a receiver 308.

The application server 302 may also include other components that may be used in conjunction with the operations as taught herein. For example, the application server 302 may include hardware 310, one or more processors 312, memory 314, and a user interface 326.

The hardware 310 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the application server 302 may include a user interface 326 for providing indications (e.g., audible and/or visual indications) to a user and/or for receiving user input (e.g., upon user actuation of a sensing device such a keypad, a touch screen, a microphone, and so on).

The memory 314 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 312 of application server 302 may execute instructions and perform tasks under the direction of software components that are stored in memory 314. For example, the memory 314 may store various software components that are executable or accessible by the one or more processors 312 of the application server 302. The various components may include software 316, a data collection module 318, a machine learning service module 320, and an administrator module 324. The software 316, data collection module 318, machine learning service module 320, and administrator module 324, collectively, may be one possible implementation of lesson determination module 176 of FIG. 1.

The software 316, data collection module 318, machine learning service module 320, and administrator module 324 may include routines, program instructions, objects, and/or data structures that perform particular tasks or implement particular abstract data types. For example, the data collection module 318 may include one or more instructions, which when executed by the one or more processors 312 direct the application server 302 to perform operations related to the collection of data 334, including results 220, telemetry data 224, and environmental data 332. In some aspects, the data collection module 318 may be configured to receive data 334 from one or more UEs and store the data 334 into one or more databases, including user database 328 and telemetry database 329. In some aspects, the data collection module 318 may be configured to receive (and store in user database 328 and/or telemetry database 329) data 334 from one or more other servers and/or nodes included in core network 140 related to the usage of the wireless communication network 100 by a UE and/or by particular user. In yet another aspect, the data collection module 318 may be configured to receive data 334 from one or more other servers external to the core network 140 via internet 175. Furthermore, the server 302 may be configured to send at least some of the data 334 received at the data collection module 318 to one or more other servers via internet 175. For example, in some aspects, server 302 may send and/or receive data 334 to/from a third-party analytics system.

In some aspects, user database 328 is configured to store information related to a user account, such as a user ID, a record or which lessons are to be pushed next to the user, and so on. In some implementations, the data stored in user database 328 is independent of the user's historical performance or recorded behavior. The telemetry database 329 is configured to store various information related to data 334, including results 220, telemetry data 224, as well as environmental data 332. In some aspects, access to the telemetry database 329 may be limited and/or safe-guarded by additional security measures to protect against unauthorized access.

In one example, the one or more of the databases 328, 329, and 330 are included in memory 314 of application server 302. Furthermore, in some aspects, access to the data stored in the one or more databases 328, 329, and 330 may be subject to access controls consistent with current privacy laws.

In some aspects, at least some of the data 334 may be encrypted and/or anonymized to protect the privacy of the data 334 collected by the data collection module 318. For example, the monitoring module 218, of FIG. 2, may generate telemetry data 224 and then encrypt the telemetry data 224 before transmitting the telemetry data 224 to the application server 170.

In yet another aspect, at least some of the telemetry data 224 received at the data collection module 318 may include a measure of certain user behavior rather than identifying the user behavior itself. For example, as mentioned above, in the context of cybersecurity, the learning determination module 176 may select one or more lessons based on user behavior such as passwords used by the user, websites visited, hyperlinks activated, etc. However, due to privacy concerns, the monitoring module 218 may assign one or more measures to the user behavior and transmit the measure, instead of transmitting the actual user behavior itself. By way of example, the monitoring module 218 may determine a measure of passwords (e.g., strong, average, weak, etc.) utilized by the user of the platform 202 and transmit the measure as telemetry data 224, rather than transmitting the actual passwords.

In yet another aspect, the data collection module 318 may store received data 334 according to a statistical model. Specifically, the data collection module 318 may first identify whether the received data is cumulative and, if so, may either not store the received telemetry or may store and mark the newly received telemetry data as repetitive or redundant when a machine learning algorithm is applied to the data.

The machine learning service module 320 may include one or more instructions, which when executed by the one or more processors 312 direct the application server 302 to perform operations related to the analysis of data 334 stored in the one or more telemetry databases 329 to determine one or more lessons 222 to provide to the user. In one example, the machine learning service module 320 determines one or more behavior patterns based on the telemetry data 224, where the behavior patterns are clustered by identity (e.g., user ID) and/or persona. For example, a cluster may be a behavior pattern associated with "John Smith", or alternatively, "John Smith Personal," or "John Smith Work," etc.

In some examples, the machine learning service module 320 may implement a machine learning technique that is a supervised, unsupervised, or a reinforcement learning technique. Examples of supervised learning techniques include K-nearest neighbor (KNN), Naive Bayes, logistic regression, support vector machine (SVM), and others. Other supervised learning analysis techniques include linear or polynomial regression analysis, decision tree analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the machine learning service module 320 to determine which, if any, of the lessons contained in lesson database 330 are to be provided to the user. These are not intended to be limiting.

In some aspects, the machine learning service module 320 may also be configured to determine (e.g., calculate) a risk assessment for the user based on the data stored in the one or more telemetry databases 329. The machine learning service module 320 may then select one or more lessons from the lesson database 330 based on the determined risk assessment. In the context of providing cybersecurity lessons, the machine learning service module 320 may assign a risk value (e.g., low, medium, high) based on environmental data 332. For example, a newly discovered security vulnerability that is particularly prevalent and/or potentially damaging to a user device/user information may be assigned a high-risk value. The risk value may then be utilized by the machine learning service module 320 in determining which lesson to select from the lesson database 330 (e.g., lessons directed to mitigating cybersecurity vulnerabilities of a high-risk value may be prioritized over lessons directed to cybersecurity practices of low risk value).

The machine learning service module 320 may also assign a risk value based on the telemetry data 224. In some aspects, telemetry data 224 that indicates that a user is engaged in activity that leaves their user device susceptible to attack/theft may be assigned a high-risk value, whereas user behavior that renders the user device less susceptible to attack/theft may be assigned a low risk value. By way of example, telemetry data 224 that indicates that the user frequently activates hyperlinks received via text message from unknown senders may be assigned a high-risk value.

In some aspects, the machine learning service module 320 may consider both the risk value of the received environmental data 332 and the risk value of the telemetry data 224 when determining which lessons to select for the user. For example, lessons that are directed to a topic that addresses both high risk user behavior and high risk environmental conditions may be prioritized.

Continuing with FIG. 3, an administrator module 324 is further illustrated as being included in the application server 302. The administrator module 324 may include one or more instructions, which when executed by the one or more processors 312 direct the application server 302 to perform operations related to providing an administrator with the ability to create, modify, delete, and add the lessons to lesson database 330. For example, the administrator module 324 may provide an interface to allow an administrator to create a lesson (e.g., problems, questions, etc.) in the lesson database 330. In another example, the administrator module 324 may allow an administrator to modify and/or set the risk assessment value for one or more user behaviors as indicated by the telemetry data 224 and/or for one or more environmental conditions as indicated by the environmental data 332.

Furthermore, in some examples, the administrator module 324 may provide an interface to allow an administrator to enter/create/edit various environmental data. For example, the administrator module 324 may allow an administrator to designate the risk assessment value for telemetry data 224 and/or environmental data 332.

Figure 4:
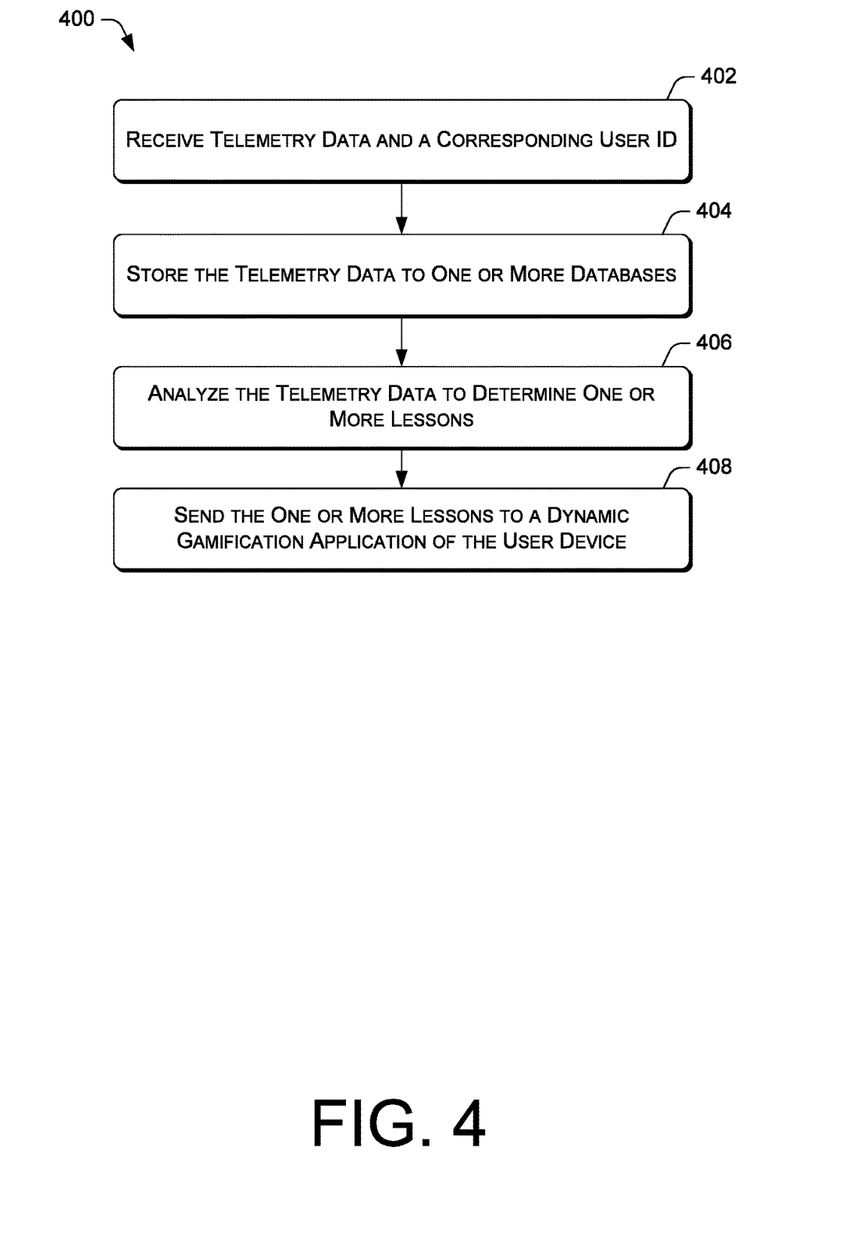
FIG. 4 is a flow diagram of an example process for dynamic lesson determination.

FIG. 4 is a flow diagram of an example process for dynamic lesson determination. Process 400 is one possible process performed by application server 170 of FIG. 1 and/or application server 302 of FIG. 3. Process 400 will be described with reference to FIGS. 2-4.

In process block 402 the data collection module 318 receives telemetry data 224 and a corresponding user ID. As mentioned above, the telemetry data 224 may indicate at least one usage of a user device (e.g., UEs 1-N of FIG. 1) by a user associated with the user ID. In some aspects, receiving the telemetry data 224 includes communicating with a monitoring module 218 of the user device, where the monitoring module 218 is configured to intercept client-side application or device use and to incorporate the application or device use into the telemetry data 224.

In one example, the received telemetry data relates to activities and/or device usage data collected locally at the UE. In one aspect, the monitoring module 218 may periodically upload telemetry data to the application server 302 according to a predetermined schedule. In another example, the application server 302 may send a request to the monitoring module 218 for the latest telemetry data. In yet another example, the monitoring module 218 may be configured to send the telemetry data in response to the launch of the dynamic gamification application 216.

Next, in process block 404, the data collection module 318 stores the telemetry data to one or more databases (e.g., telemetry database 329).

In process block 406, the machine learning service module 320 analyzes the telemetry data stored in the one or more databases to determine one or more lessons to provide to the user. As discussed above, analyzing the telemetry data may include applying one or more machine learning techniques to the telemetry data stored in the telemetry database 329 to determine which, if any, of the lessons included in the lesson database 330 are to be provided to the user. In addition to considering the telemetry data 224 received from the user device, the machine learning service module 320 may further consider telemetry data received from other user devices, environmental data 332, as well as the results 220 when determining which lessons to provide to the user.

In process block 408, the application server 302 sends the one or more lessons to the dynamic gamification application 216 and/or other application 217 of the user device (e.g., platform 202). In some aspects, the application server 302 sends the one or more lessons to the dynamic gamification application 216 by communicating with the user device via wireless communication network 100 of FIG. 1.

Figure 5:
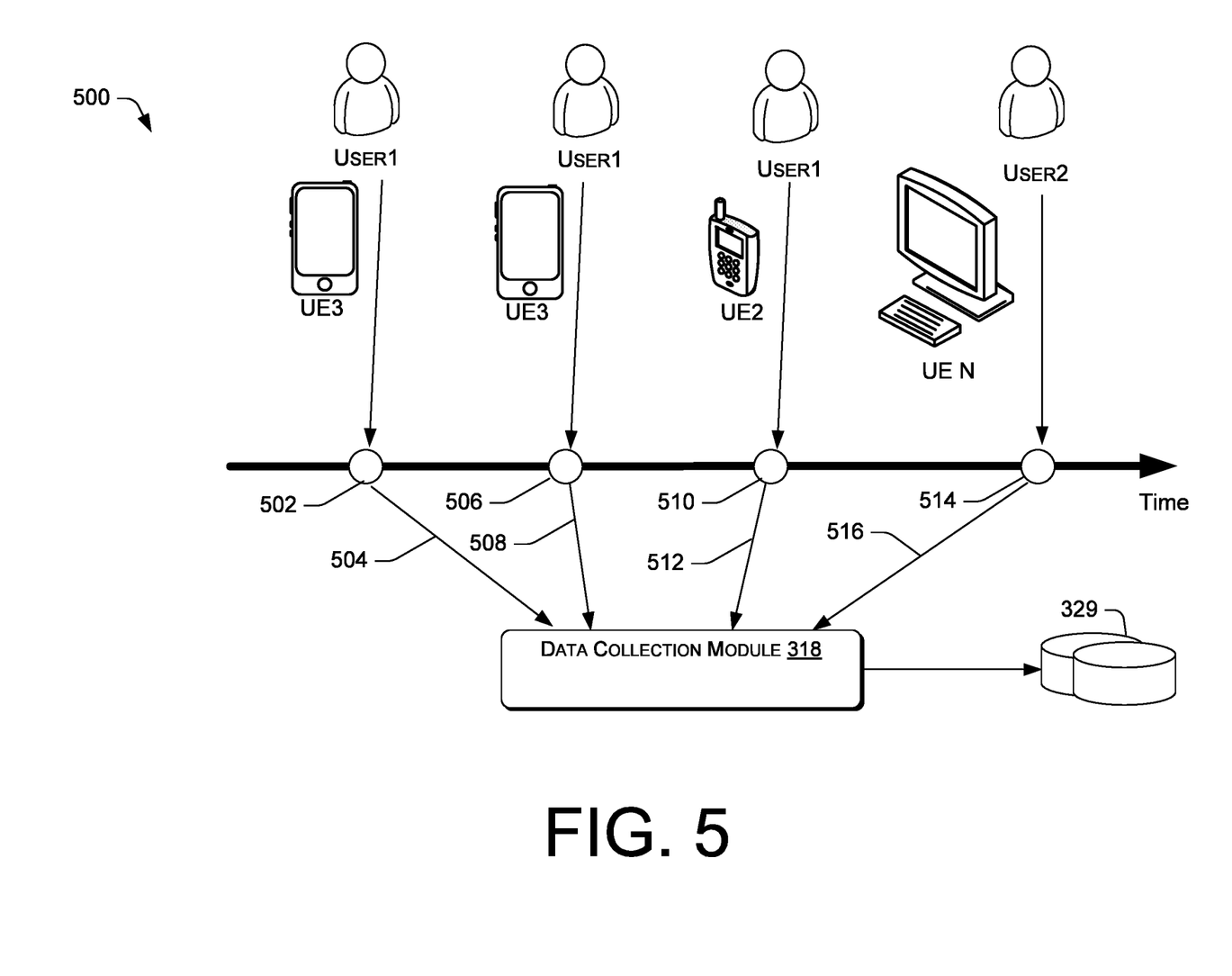
FIG. 5 is a diagram illustrating the collection of telemetry data.

FIG. 5 is a diagram illustrating the collection of telemetry data. Specifically, it illustrates how a user1 progresses over time and develops a historical (e.g., time-ordered series) of equipment usage and behavior. In this example, the illustrated usage events 502, 506, 510, and 514, collectively, represent a time-ordered series of events.

For example, User1 may interact with UE3 to generate a usage event 502. Usage event 502 could possibly be User1 using UE3 to access a web site at a particular URL. User1 may also make some purchases during the usage event 502. Data collected during usage event 502 and subsequent usage events may be sent from the monitoring module 218 to data collection module 318 as telemetry data 504. The data collection module 318 then stores records of usage event 502 to the one or more telemetry databases 329.

As User1 progresses over time, telemetry data (e.g., 508, 512, and 516) of subsequent usage events (e.g., 506, 510, and 514) are also collected by the data collection module 318. For example, as shown via usage event 506, User1 may later interact with a different information system (e.g., different website) using the same UE3. For example, usage event 506 may be User1 using UE3 to update the user's social network records at another URL. Data collection module 318 may receive the telemetry data 508 associated with usage event 506 and store the telemetry data 508 to the one or more telemetry databases 329.

Accordingly, the telemetry data collected with respect to a particular user need not be specific to a particular site or to a particular type of interaction. Any definable and observable user event whose parameters may be captured is a candidate for storing as one or more telemetry data for a user.

Furthermore, telemetry data for a user need not be specific to a particular client device. As shown via usage event 510, which may be after a number of other usage events, User1 may use a different client device, here UE2 to interact with an information system. Usage event 510 could potentially be User1 further updating the user's social network records, perhaps to upload a picture just taken with UE2. Again, data collection module 318 may receive the telemetry data 512 and store the telemetry data 512 to the one or more telemetry databases 329.

Even still, the telemetry data need not be specific to a particular user. For example, as shown in FIG. 5, User2 may interact with UE N to generate a usage event 514. Usage event 514 could possibly be User2 using UE N to access a link embedded in an instant message or email. Data collected during usage event 514 and subsequent usage events initiated by User2 may be sent to data collection module 318 as telemetry data 516. The data collection module 318 then stores records of usage event 514 to the one or more telemetry databases 329.

Accordingly, as mentioned above, the application server (e.g., server 302 of FIG. 3) may dynamically determine lessons for a user (e.g., User1) based on (1) telemetry data that indicates usage of a particular user device by the same user (e.g., User1's usage of UE3 as indicated by usage events 502 and 506), (2) telemetry data that indicates usage of a variety of user devices by the same user (e.g., User1's usage of UE3 and UE2 as indicated by usage events 502, 506, and 510), (3) telemetry data that indicates usage of another user device by another user (e.g., User2's usage of UE N as indicated by usage event 514), and (4) any combination thereof.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of dynamic lesson determination, performed by an application server, the method comprising:
receiving, at the application server, telemetry data and a corresponding user identification (ID), wherein the telemetry data indicates at least one usage of a user device by a user associated with the user ID;
receiving, at the application server, environmental data that is collected from one or more sources other than the user device, the environmental data including a current security issue affecting a network;
assigning, at the application server, a first risk value based on the telemetry data and a second risk value based on environmental data;
modifying at least one of the first risk value associated with the telemetry data or the second risk value associated with the environmental data based on a modification input of an administrator as received via an administrative interface of the application server;
analyzing, at the application server, the first risk value associated with the telemetry data and the second risk value associated with the environmental data to determine one or more lessons following modification of at least one of the first risk value or the second risk value based on the modification input from the administrator; and
sending, by the application server, the one or more lessons to a dynamic gamification application on the user device for presentation.

2. The method of claim 1, further comprising:
receiving, at the application server, additional telemetry data, wherein the additional telemetry data indicates at least one usage of another user device by another user; and
determining one or more additional lessons based on the telemetry data and the additional telemetry data.

3. The method of claim 1, wherein the environmental data further includes at least one of a newly discovered vulnerability with the network or a newly discovered computer virus.

4. The method of claim 1, further comprising:
receiving, at the application server, results from the dynamic gamification application of the user device, wherein the results indicate at least one of metrics or scores of a dynamic gamification application session performed by the user; and
determining the one or more lessons based on the telemetry data and the results.

5. The method of claim 1, wherein the one or more lessons include problems to be presented to the user of the user device via the dynamic gamification application to improve cybersecurity practices by the user.

6. The method of claim 1, wherein receiving the telemetry data comprises communicating with a monitoring module of the user device, wherein the monitoring module of the user device is configured to intercept client-side application or device use and to incorporate the client-side application or device use into the telemetry data.

7. The method of claim 6, wherein the monitoring module of the user device is configured to intercept the client-side application or device use independent of the dynamic gamification application of the user device.

8. The method of claim 7, wherein the telemetry data indicates at least one of: a measure of passwords utilized by the user, websites visited by the user, hyperlinks activated by the user, text messages sent or received by the user, applications installed on the user device, a version number of an operating system of the user device, a version number of one or more applications installed on the user device, device settings of the user device, and security settings of one or more networks accessed by the user device.

9. The method of claim 1, wherein the analyzing includes applying a machine learning service module of the application server to the first risk value associated with the telemetry data and the second risk value associated with the environmental data.

10. The method of claim 1, wherein the assigning each the first risk value and the second risk value includes assigning a high risk value, a medium risk value, or a low risk value.

11. An application server, comprising:
   at least one processor; and
   at least one memory coupled to the at least one processor, the at least one memory having instructions stored therein, which when executed by the at least one processor, direct the application server to:
      receive telemetry data and a corresponding user identification (ID), wherein the telemetry data indicates at least one usage of a user device by a user associated with the user ID;
      receive environmental data that is collected from one or more sources other than the user device, the environmental data including a current security issue affecting a network;
      assign a first risk value based on the telemetry data and a second risk value based on the environmental data;
      modify at least one of the first risk value associated with the telemetry data or the second risk value associated with the environmental data based on a modification input of an administrator as received via an administrative interface of the application server;
      analyze the first risk value associated with the telemetry data and the second risk value associated with the environmental data to determine one or more lessons following modification of at least one of the first risk value or the second risk value based on the modification input from the administrator; and
      send the one or more lessons from the application server to a dynamic gamification application on the user device for presentation.

12. The application server of claim 11, wherein the instructions further direct the application server to:
   receive additional telemetry data, wherein the additional telemetry data indicates at least one usage of another user device by another user; and
   determine one or more additional lessons based on the telemetry data and the additional telemetry data.

13. The application server of claim 11, wherein the environmental data further includes at least one of a newly discovered vulnerability with the network or a newly discovered computer virus.

14. The application server of claim 11, wherein the instructions further direct the application server to:
   receive results from the dynamic gamification application of the user device, wherein the results indicate at least one of metrics or scores of a dynamic gamification application session performed by the user; and
   determine the one or more lessons based on the telemetry data and the results.

15. The application server of claim 11, wherein the one or more lessons include problems to be presented to the user of the user device via the dynamic gamification application to improve cybersecurity practices by the user.

16. The application server of claim 11, wherein the instructions further comprise instructions to communicate with a monitoring module of the user device, wherein the monitoring module of the user device is configured to intercept client-side application or device use and to incorporate the client-side application or device use into the telemetry data.

17. The application server of claim 16, wherein the monitoring module of the user device is configured to intercept the client-side application or device use independent of the dynamic gamification application.

18. The application server of claim 17, wherein the telemetry data indicates at least one of: a measure of passwords utilized by the user, websites visited by the user, hyperlinks activated by the user, text messages responded to by the user, applications installed on the user device, a version number of an operating system of the user device, a version number of one or more applications installed on the user device, device settings of the user device, and security settings of one or more networks accessed by the user device.

19. The application server of claim 11, wherein the instructions to analyze the telemetry data comprises instructions to apply a machine learning service module of the application server to the first risk value associated with the telemetry data and the second risk value associated with the environmental data.

20. One or more non-transitory computer-readable media storing computer-executable instructions, which when executed by at least one processor of an application server, direct the application server to:
   receive telemetry data and a corresponding user identification (ID), wherein the telemetry data indicates at least one usage of a user device by a user associated with the user ID;
   receive additional data, wherein the additional data comprises at least one of: additional telemetry data, environmental data, or dynamic gamification application results, wherein the additional telemetry data indicates at least one usage of another user device by another user and the dynamic gamification application results indicate at least one of metrics or scores of a dynamic gamification application session performed by the user;
   store the telemetry data and the additional data to one or more databases;
   analyze the telemetry data and the additional data to determine one or more lessons related to cybersecurity for the user by applying one or more machine learning techniques to the telemetry data and additional data stored in the one or more databases; and
   send the one or more lessons related to cybersecurity from the application server to a dynamic gamification application on the user device for presentation by the dynamic gamification application as an additional interactive advergame within a game provided by the dynamic gamification application, wherein the one or more lessons related to cybersecurity as presented by the additional interactive advergame is unrelated to a focus of the game provided by the dynamic gamification application.

* * * * *